(12) United States Patent
Katz et al.

(10) Patent No.: US 8,681,255 B2
(45) Date of Patent: Mar. 25, 2014

(54) INTEGRATED LOW POWER DEPTH CAMERA AND PROJECTION DEVICE

(75) Inventors: Sagi Katz, Yokneam Ilit (IL); Shlomo Felzenshtein, Nesher (IL); Avishai Adler, Haifa (IL); Giora Yahav, Haifa (IL)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/892,589

(22) Filed: Sep. 28, 2010

(65) Prior Publication Data

US 2012/0075534 A1    Mar. 29, 2012

(51) Int. Cl.
*H04N 5/222* (2006.01)

(52) U.S. Cl.
USPC .................................................. 348/333.01

(58) Field of Classification Search
USPC .................................................. 348/333.01
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Travis Deyle, "Low-Cost Depth Cameras (aka Ranging Cameras or RGB-D Cameras) to Emerge in 2010?", Mar. 29, 2010, http://www.hizook.com/blog/2010/03/28/low-cost-depth-cameras-oro-rgb-d-cameras-emerge-2010.

(Continued)

*Primary Examiner* — Usman Khan
(74) *Attorney, Agent, or Firm* — Judy Yee; Peter Taylor; Micky Minhas

(57) ABSTRACT

A video projector device includes a visible light projector to project an image on a surface or object, and a visible light sensor, which can be used to obtain depth data regarding the object using a time-of-flight principle. The sensor can be a charge-coupled device which obtains color images as well as obtaining depth data. The projected light can be provided in successive frames. A frame can include a gated sub-frame of pulsed light followed by continuous light, while the sensor is gated, to obtain time of flight data, an ungated sub-frame of pulsed light followed by continuous light, while the sensor is ungated, to obtain reflectivity data and a background sub-frame of no light followed by continuous light, while the sensor is gated, to determine a level of background light. A color sub-frame projects continuous light, while the sensor is active.

17 Claims, 10 Drawing Sheets

(56) References Cited

U.S. PATENT DOCUMENTS

| | | |
|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,810,135 B1 | 10/2004 | Berenz et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,729,720 B2 | 6/2010 | Suh et al. |
| 7,746,345 B2 | 6/2010 | Hunter |
| 7,760,182 B2 | 7/2010 | Ahmad et al. |

(56) References Cited

U.S. PATENT DOCUMENTS

| | | | |
|---|---|---|---|
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2004/0037450 | A1* | 2/2004 | Bradski ............ 382/103 |
| 2006/0139314 | A1* | 6/2006 | Bell ............ 345/156 |
| 2007/0052639 | A1 | 3/2007 | Willis et al. |
| 2008/0026838 | A1 | 1/2008 | Dunstan et al. |
| 2008/0031327 | A1 | 2/2008 | Wang et al. |
| 2008/0044171 | A1 | 2/2008 | Hyatt |
| 2009/0039235 | A1 | 2/2009 | MacFarlane et al. |
| 2009/0183125 | A1 | 7/2009 | Magal et al. |
| 2009/0231425 | A1 | 9/2009 | Zalewski |
| 2010/0014134 | A1 | 1/2010 | Cable |
| 2010/0026850 | A1 | 2/2010 | Katz |
| 2010/0110386 | A1 | 5/2010 | Handschy et al. |
| 2010/0118123 | A1 | 5/2010 | Freedman et al. |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |
| WO | 2008139960 | A1 | 11/2008 |
| WO | 2010017696 | A1 | 2/2010 |

OTHER PUBLICATIONS

Gokturk et al., "A Time-Of-Flight Depth Sensor—System Description, Issues and Solutions", CVPRW, Jun. 2004, Proceedings of the 2004 Conference on Computer Vision and Pattern Recognition Workshop (CVPRW'04) vol. 3, Jun. 2004, p. 35.

Light Blue Optics, "Light Touch—Instantly Turns Any Flat Surface Into a Touch Screen", retrieved: Jul. 1, 2010, http://lightblueoptics.com/products/light-touch/.

Mistry, "SixthSense—A Wearable Gestural Interface—Integrating Information With the Real World", Apr. 2009, http://www.pranavmistry.com/projects/sixthsense/.

Primesense Ltd., "The PrimeSensor Reference Design 1.08—Natural Interaction", retrieved: Jul. 2010, http://www.primesense.com/files/FMF_2.PDF.

Jia et al., "The Mathematical Model and Applications of Coded Structured Light System for Object Detecting", Journal of Computers, vol. 4, No. 1, Jan. 2009, pp. 53-60.

Picoprojector-Info, "Projector Phone", retrieved: Jul. 2010, http://www.picoprojector-info.com/projector-phone.

Klier et al., "You Are the Interface! ZCam, 3DV's Depth-Sensing Camera", 2008 ACM SIGGRAPH, Aug. 2008, For Attendees: SIGGRPAPH 2008—New Tech Demos, http://www.siggraph.org/s2008/attendees/network/3.php.

U.S. Appl. No. 12/748,231, filed Mar. 26, 2010, titled "Enhancing Presentations Using Depth Sensing Cameras".

U.S. Appl. No. 12/699,074, filed Feb. 3, 2010, titled "Fast Gating Photosurface".

Baldauf, "Supporting Hand Gesture Manipulation of Projected Content with Mobile Phones," Proc. of the Workshop on Mobile Interaction with the Real World (MIRW 2009), in conjunction with MobileHCI 2009, Sep. 2009.

Canesta 101, "Introduction to 3D Vision in CMOS," Mar. 2008.

Lange et al., "Solid-State Time-of-Flight Range Camera," IEEE Journal of Quantum Electronics, vol. 37, No. 3, Mar. 2001.

Toyama, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

(56) References Cited

OTHER PUBLICATIONS

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Chinese Office Action dated Jan. 6, 2014, Chinese Patent Application No. 201110306956.0.

\* cited by examiner

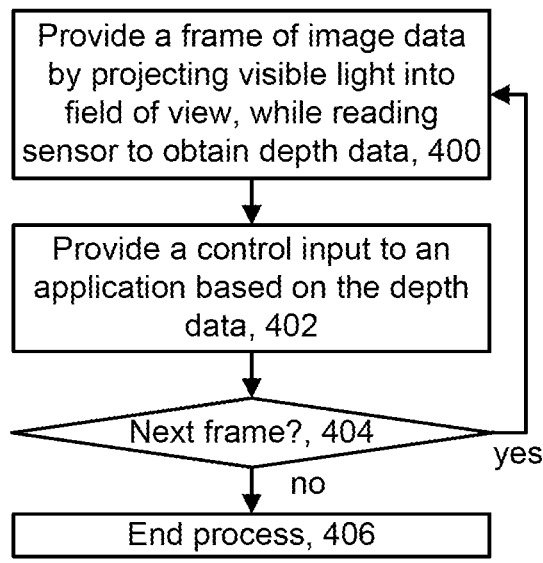
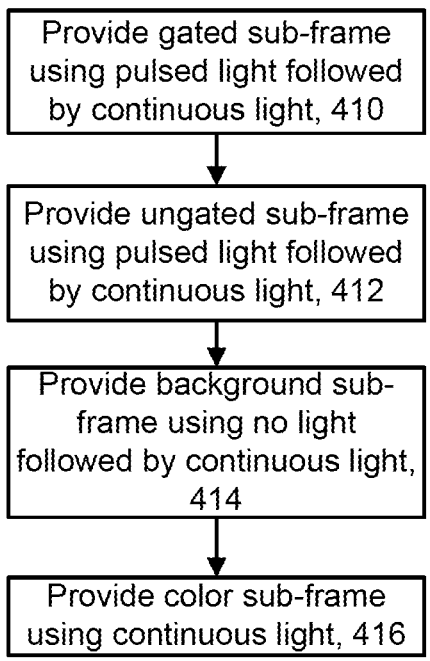
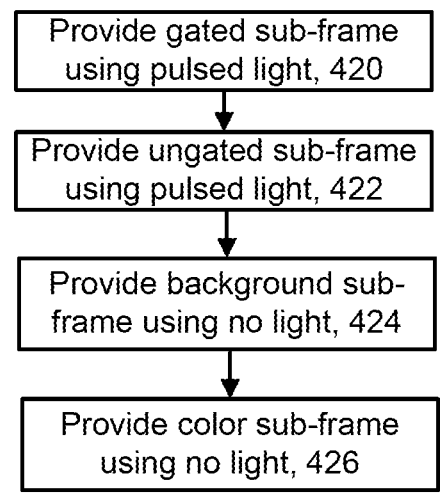

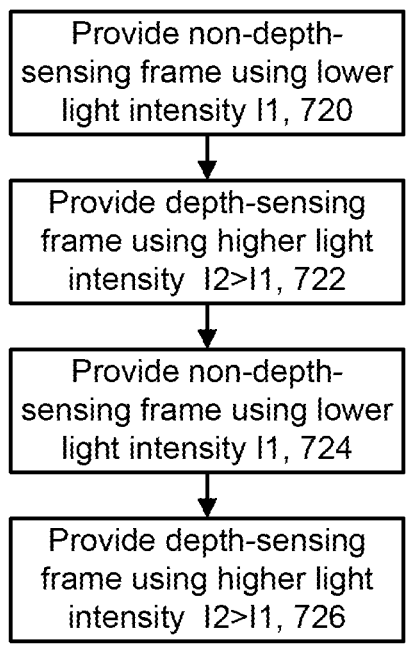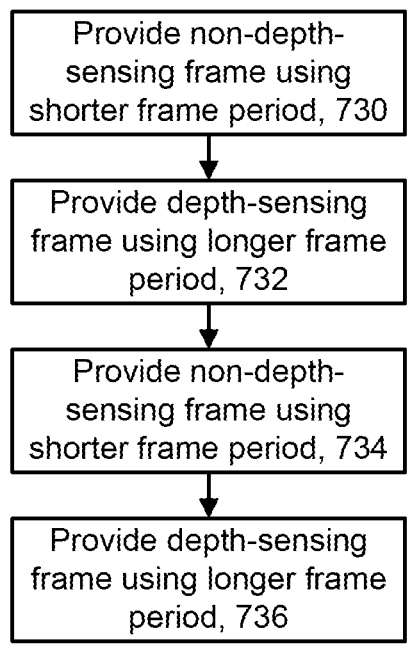

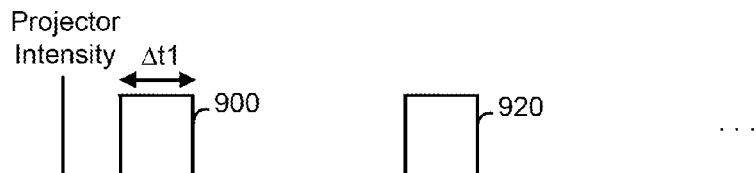
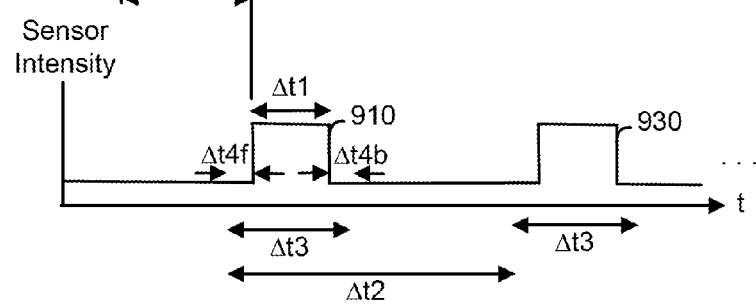
Fig. 9A
Fig. 9B
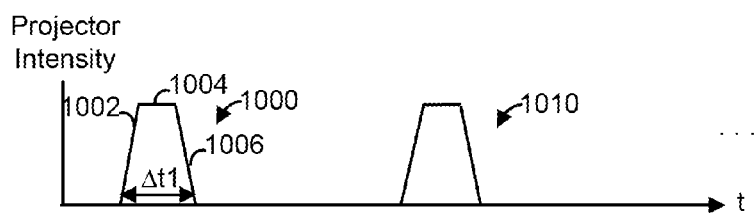
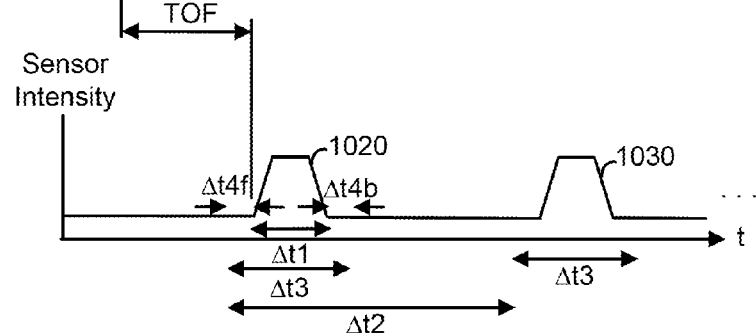
Fig. 10A
Fig. 10B

US 8,681,255 B2

INTEGRATED LOW POWER DEPTH CAMERA AND PROJECTION DEVICE

BACKGROUND

A real-time depth camera is able to determine the distance to a human or other object in a field of view of the camera, and to update the distance substantially in real time based on a frame rate of the camera. Such a depth camera can be used in a motion capture systems, for instance, to obtain data regarding the location and movement of a human body or other subject in a physical space, and can use the data as an input to an application in a computing system. Many applications are possible, such as for military, entertainment, sports and medical purposes. A depth camera typically includes an infrared illuminator which illuminates the field of view, and one or more infrared image sensors which sense reflected light from the field of view to form an image. Moreover, the depth camera can be provided as part of a gaming console which communicates with a display device such as a television in a user's home. However, various challenges exist in adapting depth camera technology for portable or other small form factor devices such a video projector devices. These challenges include power and space limitations.

SUMMARY

A video projector device is provided which achieves the goals of compact size and reduced power consumption and cost. A backlight of the video projector device is modulated to create light pulses that can be detected by a visible light camera and transformed into distance/depth data regarding a field of view. This kind of modulation does not noticeably affect the image quality of the projected light and can be embodied in a variety of mobile or non-mobile devices which are used for various applications which run on the device or on a host connected to the device.

In one embodiment, a video projector device includes a light source, such as the backlight of a projector, which emits visible light. In a projector portion of the video projector device, a driver is provided which modulates the visible light emitted from the light source. Also, one or more light-transmissive LCD panels which have individually controllable pixels can be provided to impart color video information to the visible light from the light source. At least one optical component is provided which projects the color coded visible light in a field of view. For instance, one or more lenses can be used. In a sensor portion of the video projector device, one or more sensors such as charge-coupled devices (CCDs) are provided which sense visible light, including visible light which is reflected from at least one object in the field of view, where the sensor comprises an array of pixels. Advantageously, the sensor can be a conventional CCD of the type which is used in digital cameras. At least one control circuit is provided which projects video frames. A frame can include a gated sub-frame in which the light source is driven in a pulsed mode while the sensor is operated in a gated mode, followed by the light source being driven in a continuous mode while the sensor is read to obtain light intensity values. The at least one control circuit obtains depth data regarding the at least one object in the field of view based on the light intensity values, using a time-of-flight principle. The depth data can be provided in the form of a depth map of the field of view, for instance.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 4A depicts a process which uses a video projector device.

FIG. 4B depicts an example of a process involving sub-frames which can be used in step 400 of FIG. 4A.

FIG. 4C depicts another example of a process involving sub-frames which can be used in step 400 of FIG. 4A.

FIG. 7D depicts an example frame sequence which alternately provides frames with lower and higher light intensities.

FIG. 7E depicts an example frame sequence which alternately provides frames with longer and shorter frame periods.

FIG. 9A depicts pulsed light which is output from a projector using square waveforms.

FIG. 9B depicts pulsed light which is input to a sensor based on the projector output of FIG. 9A.

FIG. 10A depicts pulsed light which is output from a projector using triangular waveforms.

FIG. 10B depicts pulsed light which is input to a sensor based on the projector output of FIG. 10A.

DETAILED DESCRIPTION

A video projector device is provided which is useful in a number of applications. One example application projects an image on a surface, where the image has a number of selectable image portions such as menu item in a user interface. A user can gesture using his hand, for instance, to select one of the image portions. A corresponding control input can be provided to the application such as to select new video or still image content, modify the currently projected video or still image content, play a game, initiate a communication such as a phone call, and so forth. In one approach, the image projected on the surface becomes a touch display. In another example application, the 3-D shape of an object in the field of view is sensed and recorded. The video projector device advantageously uses a visible light projector to both project continuous light in a desired pattern in the field of view, such as on a surface or object in the field of view, while also providing pulsed light for use in obtaining depth data using a time-of-flight principle. The depth data can be obtained by periodically driving a light source to provide visible light pulses, for a limited period, relative to a period in which a continuous light output is provided, so that image quality is not noticeably reduced. During the limited period, a sensor of the video projector device is gated to detect reflected visible light pulses from the field of view. The sensor also has the ability to obtain color data from the field of view, such as to obtain a still image, e.g., a photograph, or video images, e.g., a video, like a typical digital camera.

The elements which are commonly used in a video projector device can be used in a new way to achieve an additional functionality, by transforming the device into a 3-D data detection device. For instance, 3-D depth data can be obtained for an object which is near a surface on which the video image is projected.

The video projector can also operate in a sensing-only mode in which the visible light pulses are provided but no continuous light output is provided. In another option, to increase color contrast, frame duration can be lengthened and/or light intensity can be increased when the video projector operates in a projection and sensing mode, relative to when the video projector operates in a projection-only mode.

Figure 1:
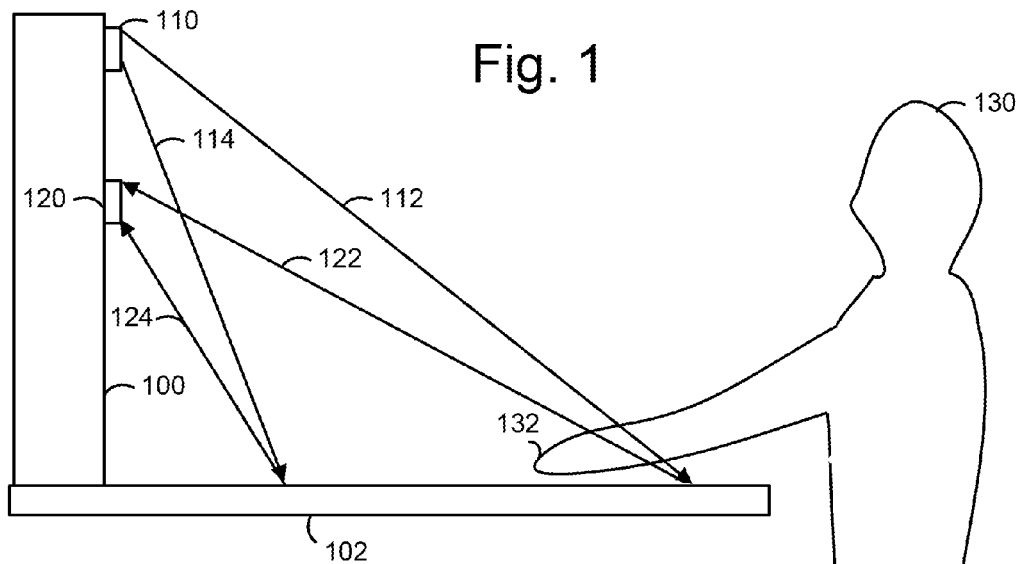
FIG. 1 depicts a side view of an example environment involving a video projector device.

FIG. 1 depicts a side view of example environment involving a video projector device. As mentioned at the outset, depth cameras have become increasingly common. Depth sensing technology can be used in other products such as mobile or other small form factor video projector devices. Video projector devices include small handheld devices sometimes referred to as pico projectors, mobile projectors and pocket projectors. Such devices can include miniaturized hardware and software that can project digital images onto any nearby viewing surface, such as a flat wall or table, or, generally any shaped surface/object. Video projector devices can include other devices which are not necessarily hand held or portable, including device which rest on a table top and device which are mounted to a wall or other surface.

One application is to display a still or video image and allow a user to modify the image by moving through hand gestures. For example, a gesture of moving the hands, or fingers of one hand, apart, can result in the projected image becoming magnified/zoomed in, and an opposite movement results in the projected image becoming smaller/zoomed out. The user can appear to lift or otherwise select an object from the projected image so that projection of the object changes when the object is selected. A gesture of waving or flicking the hand sideways can result in scrolling of a menu, or stopping or starting a video or still image display. A natural user interface (NUI) experience can be created in which the user interacts with projected objects as if they were real, physical objects. Many other applications are possible. Further information regarding tracking a portion of a person, an entire person, or another object can be found in, e.g., US 2010/0197399, published Aug. 5, 2010, titled "Visual Target Tracking," and US 2010/0194872, published Aug. 5, 2010, titled "Body Scan," each of which is incorporated herein by reference.

In FIG. 1, a video projector device 100 is depicted as resting on a table top 102. A projector lens 100 is used to transmit or project visible light in a field of view which is bounded by light rays 112 and 114, in this example. A portion of the projected light is reflected, as depicted by a region which is bounded by light rays 122 and 124, and sensed by a sensor in the video projector device 100, via a camera lens 120. A user 130 places his arm or hand 132 into the projected field of view, such that the presence of the hand and any movement of the hand can be sensed by the sensor.

Figure 2:
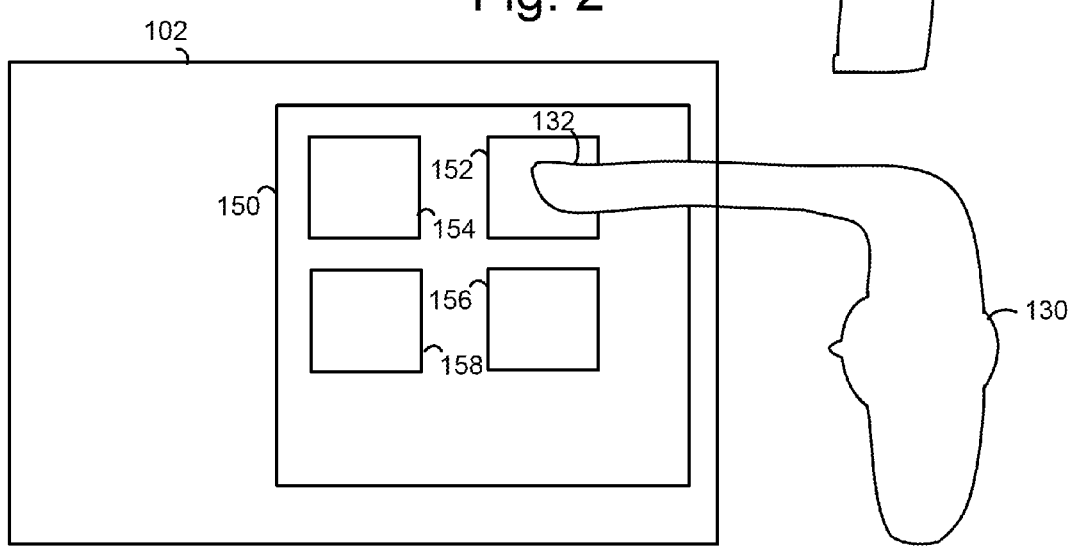
FIG. 2 depicts a top view of the example environment of FIG. 1.

FIG. 2 depicts a top view of the example environment of FIG. 1. An image region 150 is projected by the video projector device on the table top 102. The image region 150 includes image portions 152, 154, 156 and 158, for instance. The user may select the image portion 152 by placing the hand 132 over the image portion 152. Selection of the image portion 152 can be triggered in different ways. In one approach, the presence of the hand over the image portion 152 for a minimum period of time such as 1-2 seconds can trigger selection of the image portion 152. In another approach, the user is required to perform a gesture such as placing the hand above the image portion 152 followed by lowering the hand toward the image portion 152, or raising the hand away from the image portion 152. Many other possibilities exist. A similar example can be provided where the image is projected on a vertical surface or to another surface which is not necessarily flat.

Figure 3:
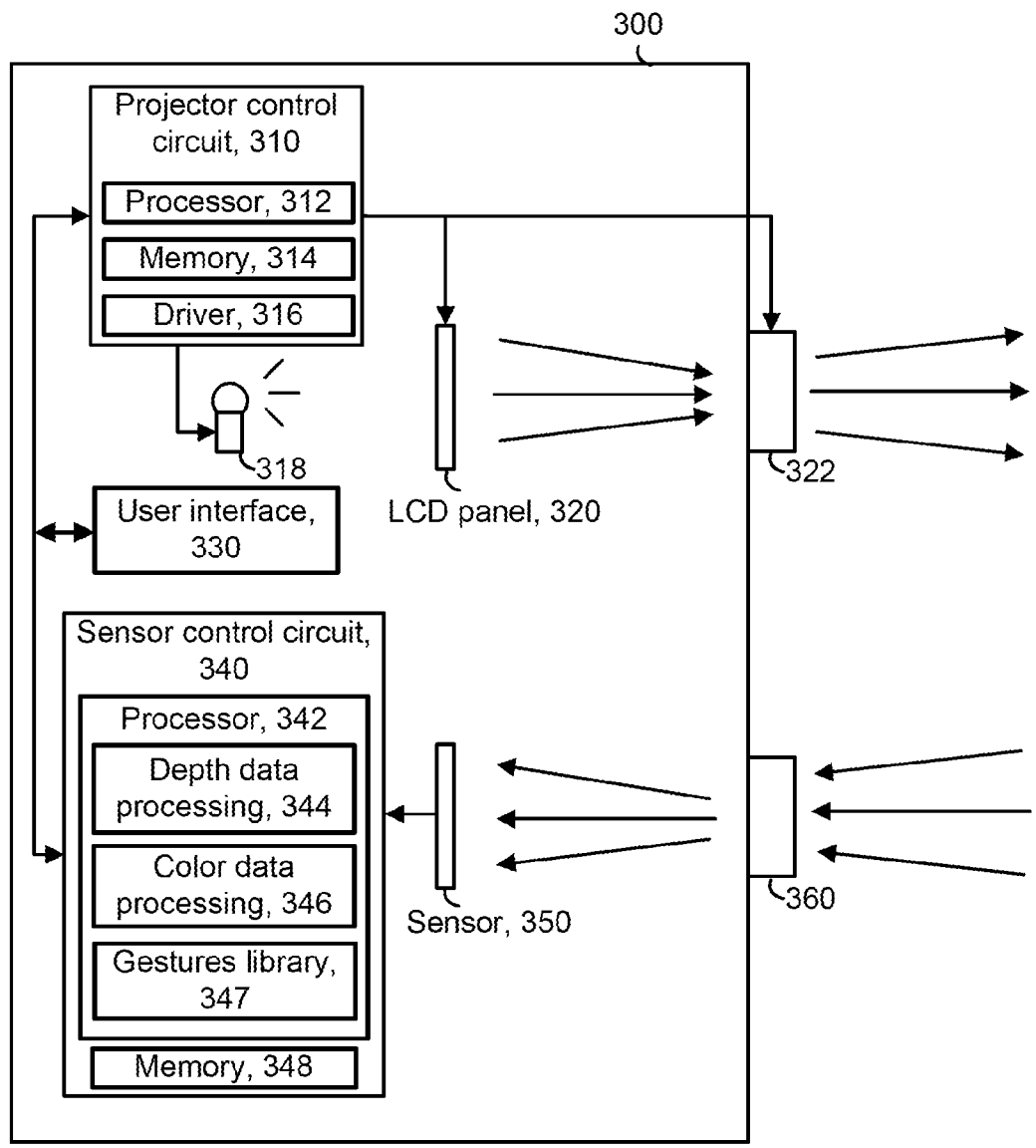
FIG. 3 depicts an example block diagram of the video projector device of FIG. 1.

FIG. 3 depicts an example block diagram of the video projector device of FIG. 1. The components can be provided in a single housing. The video projector device 300 includes a light source 318, such as a backlight, which can be activated (powered or turned on) to emit continuous or pulsed visible light. The light source 318 can also be deactivated (depowered or turned off) so that it emits no visible light, to reduce power consumption. The light source is modulated during depth sensing and kept activated during video projection. If it is turned off, this means that the system is only able to capture color video/images. The light source 318 can include one or more light-emitting diodes (LEDs), in one possible approach. Various other optical components which are not depicted are also typically employed. In one approach, when a white light source such as a metal halide lamp is used, the light source comprises white light which is separated into three color components (e.g., red, green and blue) by a prism and each color component passes through a separate modulator. The modulated light of each color is subsequently combined and projected using appropriate optical components. In another approach, the white light is provided to a single modulator via a component such as a color wheel so that red, green and blue components, for instance, and provided in a time-multiplexed manner to the modulator. In another approach, such as when LEDs are used, each group of LEDs emits a different color, such as red, green and blue, each color component passes through a separate modulator, and the modulated light of each color is subsequently combined and projected using appropriate optical components.

Another option for the light source is the Digital Light Processing (DLP)® chip (Texas Instruments, Inc.), which contains a rectangular array of up to 2 million hinge-mounted microscopic mirrors, which can reflect a digital image onto a screen or other surface. Modulation of the DLP chip is similar to modulation of an LCD chip. In a single DLP chip configuration, white light passes through a color filter, causing red, green, blue and even additional primary colors such as yellow cyan, magenta and more to be shone in sequence on the surface of the DLP chip. The switching of the mirrors, and the proportion of time they are 'on' or 'off' is coordinated according to the color shining on them. Then the sequential colors blend to create a full-color image which is projected.

A LCD panel 320 encodes the emitted light from the light source with color video information, to provide color encoded visible light which is projected via at least one optical component such as a projection lens 322. One or more light-transmissive LCD panels can be provided, for instance, such as by using light-transmissive LCD chips. The LCD panel can include one or more arrays of light-transmissive pixels, where each pixel can each be controlled individually, responsive to a projector control circuit 310. The pixels of the LCD panel can be controlled to impart image data such as a desired color image which is to be projected.

The projection lens 322 and/or sensor lens 360 can be controlled by the projector control circuit 310 such as to provide an auto-focus feature, based on depth information which is provided to the projector control circuit 310 from a sensor control circuit 340. With a known depth or range of depths of one or more objects in the field of view, an optimum focus can be set.

The projector control circuit 310 can include one or more processors, represented by processor 312, one or more memory components, represented by memory component 314 and one or more drivers, represented by driver 316. The processor can be a micro-processor, for instance, which executes instructions which are stored in the memory 314 to provide a functionality as described herein. The memory 314 can store instructions that are executed by the processor 312, as well as storing image data for controlling the LCD panel 320 to provide a desired projected image. For example, the memory 314 may include random access memory (RAM), read only memory (ROM), cache, flash memory, a hard disk, or any other suitable tangible computer readable storage medium. The memory component 314 may be a separate component in communication with the processor 312 and/or the projector control circuit 310 via a bus, for instance. Or, the memory component 314 may be integrated into the processor 312 and/or the projector control circuit 310. The memory 314 is a tangible computer readable storage medium having computer readable software embodied thereon for programming at least one processor 312 to perform a method for processing image data in a video projector device as described herein.

The driver 316 communicates with the light source to drive or modulate it as described herein. For example, the current and/or voltage to the light source can be modulated by the driver, so that the emitted light is modulated. The driver can be a custom driver which supports both a fast pulse mode and a continuous illumination mode. The projector control circuit can control rows and columns of pixels of the LCD panel.

A user interface 330 can include controls such as buttons or a touch screen which allows a user to enter commands to control the video projector device. Examples commands include starting or stopping a video projector sequence of frames, starting or stopping a projection of a still image, e.g., a single frame, and starting or stopping a depth sensing mode. In one approach, the user has the option of capturing a single frame of depth data, similar to a snap shot, in a sensing only mode. The user can set, e.g., a projecting and depth-sensing mode, a projecting and non-depth-sensing mode, or a depth-sensing but non-projecting mode. The user can also adjust settings which affect a response or sensitivity in tracking an object in the field of view. Different users may prefer different levels of tracking sensitivity in different situations, as they interact with a projected image. The user may also adjust settings such as projector brightness.

A sensor portion of the video projector device 300 includes a sensor lens 360 through which visible light from the field of view passes and reaches one or more sensors, represented by a sensor 350. The visible light can include reflections of the projected light as well as ambient, background light, such as from artificial light sources other than the video projector device, e.g., electric lamps, and from natural light sources, e.g., sunlight in a room. The sensor can include one or more CCDs, for instance, which have light-sensitive pixels. Each pixel generates charge, and the amount of accumulated or integrated charge can be read as an indication of the light intensity which has reached the pixel. The sensor can operate in a gated or ungated mode, under the control of a sensor control circuit 340.

In one implementation of a gated operation, the pixels are alternately activated and deactivated in a controlled sequence. A time in which the pixels are activated is referred to as a gated period. When a pixel is activated, it can sense light and accumulate charge. When a pixel is deactivated, it cannot sense light and accumulate charge, even if light is incident upon the pixel. In another implementation of gated operation, a separate modulator (not shown) can be provided which is between the sensor 350 and the lens 360, and which has the ability to block or pass light, like a shutter. The modulator or sensor can act as a shutter which can be opened or closed as desired.

In one implementation of ungated operation, the sensor pixels are activated so that they accumulate charge in an uninterrupted time period, after which the amount of accumulated charge is read out by the sensor control circuit 340.

The sensor control circuit 340 can include one or more processors, represented by processor 342, and one or more memory components, represented by memory component 348. The processor can be a micro-processor, for instance, which executes instructions which are stored in the memory 348 to provide a functionality as described herein. The memory 348 can store instructions that are executed by the processor 312, as well as storing readings and image data from the sensor. The memory 348 can be configured similarly to the memory 314 as discussed above. The memory 348 is a tangible computer readable storage medium having computer readable software embodied thereon for programming at least one processor 342 to perform a method for processing image data in a video projector device as described herein.

The processor 342 can include a depth data processing portion 344 which receives readings from the sensor and translates them into depth data for each pixel of the sensor. For example, a reading from a pixel can indicate an amount of accumulated charge and this can be correlated with a light intensity based on characteristics of the sensor. Moreover, timing of the sensed light of a pixel can be correlated with pulses of light from the projector, when the projector operates in a pulsed mode and the sensor operates in a gated mode. This allows a depth value to be associated with the pixel based on time-of-flight principles. To obtain depth values, we need two measurements: gated and ungated. A set of depth values from some or all pixels of the sensor provides a depth map for a frame of sensed image data. The depth map can be stored in the memory 348, for instance. The sensor control circuit 340 can communicate with the projector control circuit to obtain timing data which the depth data processing portion 344 uses to calculate depth values. Optionally, a central control circuit manages the projector control circuit 310 and the sensor control circuit 340, including providing timing data for setting a pulsed or continuous mode in the projector control circuit 310, and for setting a gated or ungated mode in the sensor control circuit 340.

The processor 342 can include a color data processing portion 346 which receives color pixel data from the sensor, similar to the way in which a still or video camera sensor operates. In this way, color images of the field of view of the sensor can be obtained and stored in the memory 348, for instance.

The processor 342 can also include a gestures library 347, such as a collection of gesture filters, each having information concerning a gesture that may be performed by a user, including hand gestures. By comparing a detected motion to each filter, a specified gesture or movement which is performed by the user can be identified.

FIG. 4A depicts a process which uses a video projector device. Step 400 includes providing a frame of image data by projecting visible light into a field of view, while reading the sensor to obtain depth data. Step 402 includes providing a control input to an application based on the depth data. Decision step 404 determines whether a next frame is to be projected. If a next frame is to be projected, the process repeats starting at step 400. If no next frame is to be projected, the process ends at step 406. Example implementations of step 400 are discussed below.

Figure 7A:
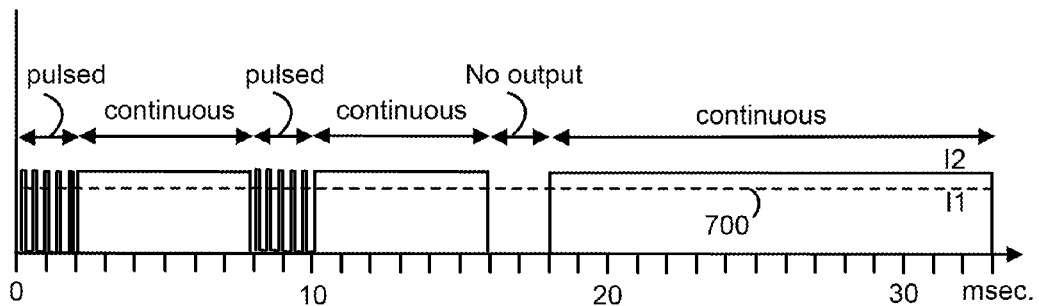
FIG. 7A depicts an output of a projector which corresponds to the process of FIG. 4B.
Figure 7B:
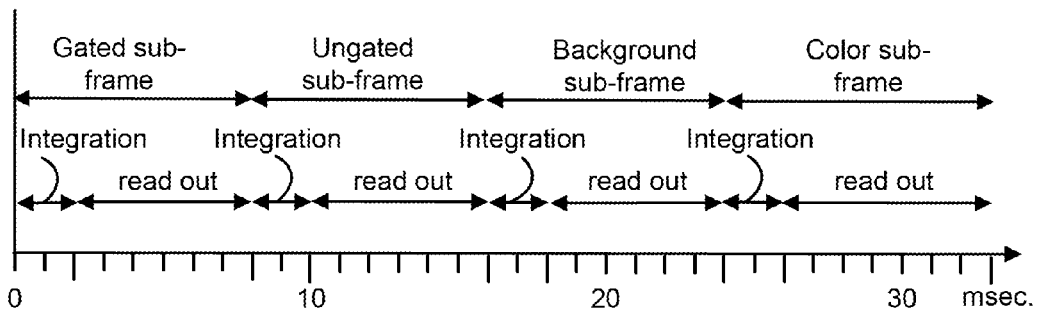
FIG. 7B depicts an input to a sensor based on the projector output of FIG. 7A.

FIG. 4B depicts an example of a process involving sub-frames which can be used in step 400 of FIG. 4A. Generally, light emitted by the light source can be modulated accordance to a gating sequence of the sensor. For example, one possible implementation of the sensor is the SONY R® model ICX424AQ CCD sensor. The ICX424AL is a diagonal 6 mm (Type 1/3) interline CCD solid-state image sensor with a square pixel array. Progressive scan allows all pixel's signals to be output independently within approximately 1/60 second. The chip has an electronic shutter with variable charge-storage time which makes it possible to realize full-frame still images without a mechanical shutter. It supports several pixel resolutions/modes including Video Graphics Array (VGA) (640×480 @ 60 Hz), quarter-VGA (QVGA) (320×240 @ 120 Hz) and quarter-QVGA (QQVGA) (160×120 @ 240 Hz). Referring also to FIGS. 7A and 7B, assume the QQVGA mode is used, which includes a 33 msec. projection period or full frame period which is divided into four sections or sub-frames. In each sub-frame, the sensor is exposed to light, and light intensity values are read in selected sub-frames.

A full frame can be defined by a frame of pixel data which is to be projected. In the different sub-frames in which the pixel data is projected, in a pulsed or continuous mode, the same pixel data of the frame can be used. Although, if the projected image has black sections in it, we won't be able to measure depth if the pulsed light will show the same image. This can be solved in several ways, including changing the black level (so it will project something). Sub-frames are images that, when combined, provide the full output of a frame. For example, gated and ungated images are sub-frames. In our notation, a frame contains all the sub-frames in one cycle of sensing. The projected pixel data is independent of (although synchronized with) the light source modulation. The driver of the light source generally has no access to the projected pixel data.

Step 410 provides a gated sub-frame using pulsed light followed by continuous light. In this sub-frame, pulses are sent by the projector and a gated image is sensed by the sensor, e.g., the sensor is allowed to sense light only during limited intervals which correspond to each transmitted pulse. The projector provides a continuous illumination mode after the pulsed illumination is used. The gated sub-frame can yield light intensity values which correlate with depth data of one or more objects in the field of view.

Step 412 provides an ungated sub-frame using pulsed light followed by continuous light. In this sub-frame, pulses are again sent by the projector but an ungated image is sensed by the sensor. Usually, in the ungated mode, the sensor behaves similarly to the gated mode, with the main difference being the time that the shutter opens and closes. In any case, in order to increase robustness to ambient light, the sensor is open in time intervals that correspond to each transmitted pulse. The ungated sub-frame can yield reflectivity data of one or more objects in the field of view.

Step 414 provides a background sub-frame using no light followed by continuous light. In this sub-frame, initially no light is sent by the projector so that background light is sensed by the sensor. Subsequently, continuous light is provided by the projector. The background sub-frame can yield data regarding background light in the field of view. The background light does not originate from the video projector device and can be from man-made or natural sources.

Step 416 provides an optional color sub-frame using continuous light. In this sub-frame, the sensor acts as a camera by sensing and storing color data from the field of view. The color data could be a standard RGB image, for instance. In the color sub-frame, the light can be driven in a continuous mode while the sensor is active.

Note that the order of the sub-frames can vary. In one approach, the gated sub-frame is provided, followed by the ungated sub-frame, followed by the background sub-frame, followed by the color sub-frame. However, this order is not required. Moreover, the different sub-frames can be provided with different frequencies of occurrence. For example, the gated sub-frame can be provided every n1≥1 frames, the ungated sub-frame can be provided every n2≥1 frames, the background sub-frame can be provided every n3≥1 frames, and the color sub-frame can be provided every n4≥1 frames, if used at all. n1, n2, n3 and n4 are positive integers. For example, assume it is sufficient to provide depth data for every two frames, so n1=n2=n3=2 and n4=1. When one or more sub-frames are not provided in a frame, the remaining portions of the frame can be extended to fill the frame period. For example, for a frame which includes only the color sub-frame, the color sub-frame is extended to the full 33 msec. Or, the frame duration can be shortened. In one approach, the rest of the time of the frame can be used for continuous projection so as to increase the contrast of the projected video. For depth sensing, it is undesired to extend the exposure time. For color, on the other hand, it might be desired in low light scenes.

In another example, if we don't need color data, a second background sensing can be provided in which a frame includes a background sub-frame, a gated sub-frame, an ungated sub-frame and a background sub-frame, in that order.

Figure 8A:
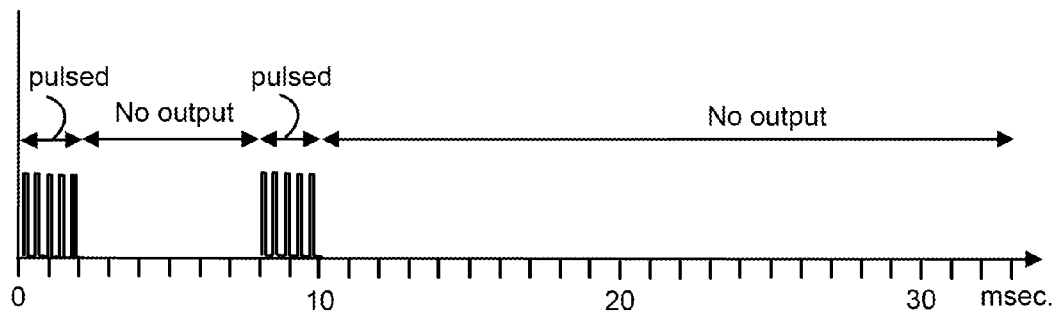
FIG. 8A depicts an output of a projector which corresponds to the process of FIG. 4C.
Figure 8B:
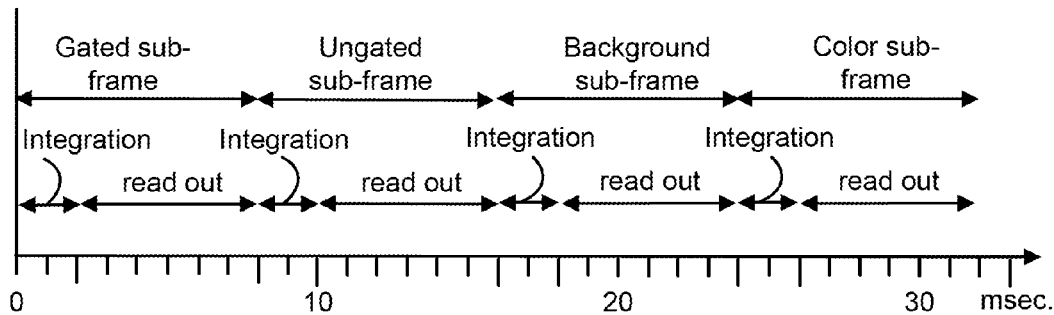
FIG. 8B depicts an input to a sensor based on the projector output of FIG. 8A.

FIG. 4C depicts another example of a process involving sub-frames which can be used in step 400 of FIG. 4A. In this case, depth sensing only is performed, with no continuous projection in the field of view. Step 420 includes providing a gated sub-frame using pulsed light, which is not followed by continuous light. Step 422 includes providing an ungated sub-frame using pulsed light, which again is not followed by continuous light. The pulsed visible light will generally not be noticeable to the human eye, since the illumination period is very short. There can also be a background image taken (an image with no pulses) (step 424). In this case, the background image and the color image can be the same image since there is no difference in lighting conditions. A color sub-frame can also be provided (step 426), which is the same as the background sub-frame. An advantage of depth sensing without continuous projecting is that power consumption is reduced. Refer to FIGS. 8A and 8B for further details.

Figure 5A:
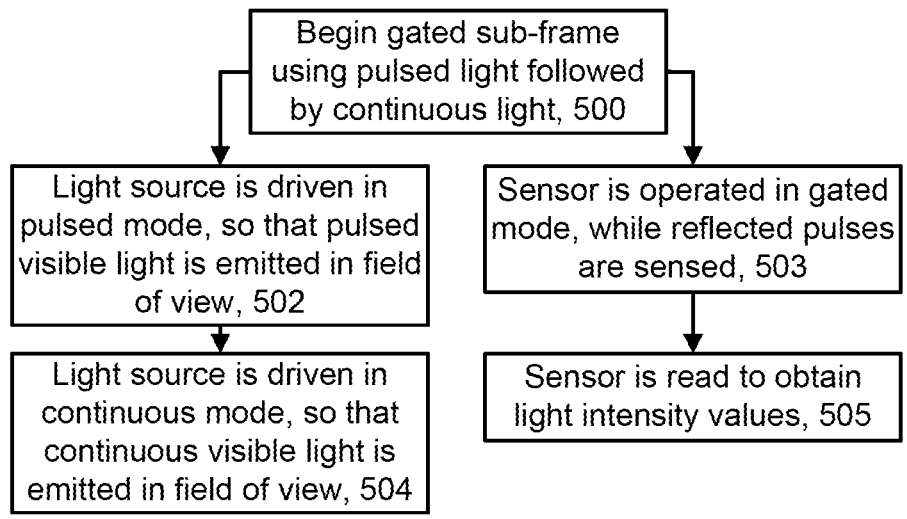
FIG. 5A depicts an example of a process for providing a gated sub-frame as set forth in step 410 of FIG. 4B.

FIG. 5A depicts an example of a process for providing a gated sub-frame as set forth in step 410 of FIG. 4B. Step 500 begins a gated sub-frame which uses pulsed light followed by continuous light from the projector. Steps 502 and 503 can occur concurrently, at least in part. In one approach, the light source continuously emits visible light. In step 502, the light source of the projector is driven in a pulsed mode, so that pulsed visible light is emitted in the field of view. FIGS. 9A and 10A provide example waveforms for pulsed light. See also time 0-2 msec. in FIG. 7A. In step 503, the sensor is operated in a gated mode, while reflected pulses (as well as background light) are sensed. FIGS. 9B and 10B provide example waveforms for sensed light. See also time 0-2 msec. in FIG. 7B.

Steps 504 and 505 can occur concurrently, at least in part. At step 504, the light source is driven in a continuous mode, so that continuous visible light is emitted in the field of view. See time 2-8 msec. in FIG. 7A. At step 505, the sensor is read to obtain light intensity values. See time 2-8 msec. in FIG. 7B. During this read out period, no additional light is sensed by the sensor. The light intensity values can be stored for subsequent use in determining depth values. For example, the light intensity values may be normalized based on light intensity values, which are obtained in the ungated sub-frame. This normalization is done after subtracting the background sub-frame from both gated and ungated sub-frames. The normalized light intensity values can then be used to determine depth values.

Figure 5B:
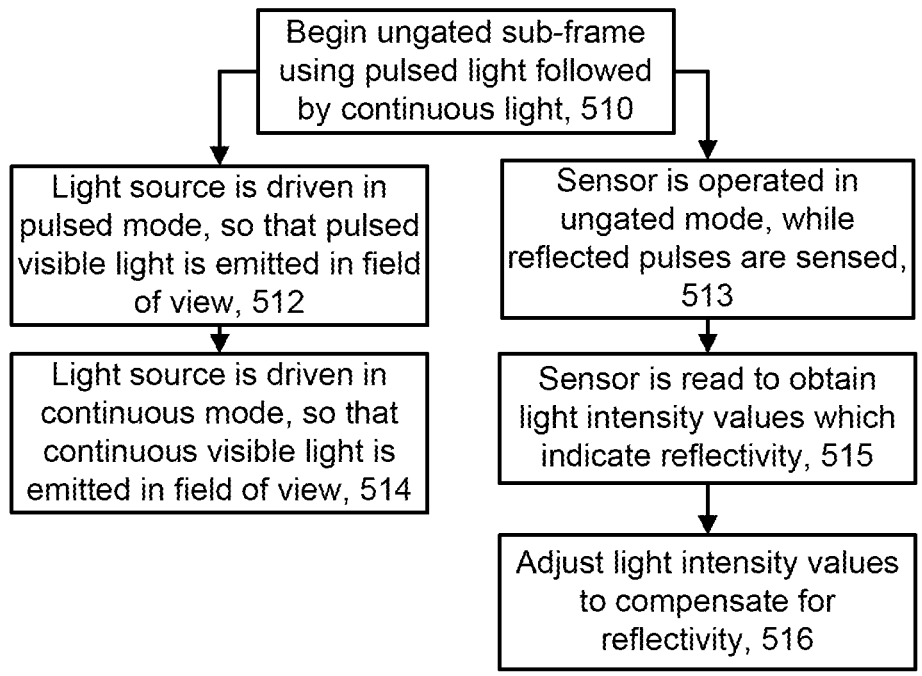
FIG. 5B depicts an example of a process for providing an ungated sub-frame as set forth in step 412 of FIG. 4B.

FIG. 5B depicts an example of a process for providing an ungated sub-frame as set forth in step 412 of FIG. 4B. Step 510 begins an ungated sub-frame which uses pulsed light followed by continuous light from the projector. Steps 512 and 513 can occur concurrently, at least in part. In step 512, the light source is driven in a pulsed mode, so that pulsed visible light is emitted in the field of view. FIGS. 9A and 10A provide example waveforms for pulsed light. See also time 8-10 msec. in FIG. 7A. In step 513, the sensor is operated in an ungated mode, while reflected pulses (as well as background light) are sensed. FIGS. 9B and 10B provide example waveforms for sensed light. See also time 8-10 msec. in FIG. 7B.

Steps 514 and 515 can occur concurrently, at least in part. At step 514, the light source is driven in a continuous mode, so that continuous visible light is emitted in the field of view. See time 10-16 msec. in FIG. 7A. At step 515, the sensor is read to obtain light intensity values which indicate reflectivity. See time 10-16 msec. in FIG. 7B. At step 516, the light intensity values which were determined at step 505 of FIG. 5A are adjusted, e.g., normalized, based on the light intensity values of step 515. Generally, several properties affect the amount of light which reaches each pixel of the sensor, including the distance the light traveled, the reflectivity of the object, and the normal direction of the object which the light reflects off of. This adjustment accounts for reflectivity and the normal direction. During the ungated sub-frame, for each pulse, we close the shutter to the sensor at a specific time, after getting back all the light that is projected into the field of view and reflected back to the sensor. In contrast, with the gated image, we do not wait for all of the light pulse to reflect back to the sensor. If a relatively high amount of light reflects back due to reflectivity and/or the normal directions, we will have a relatively high ungated light intensity value. The light intensity values of step 505 can be normalized to create depth values by dividing by the corresponding light intensity values of step 515.

Figure 5C:
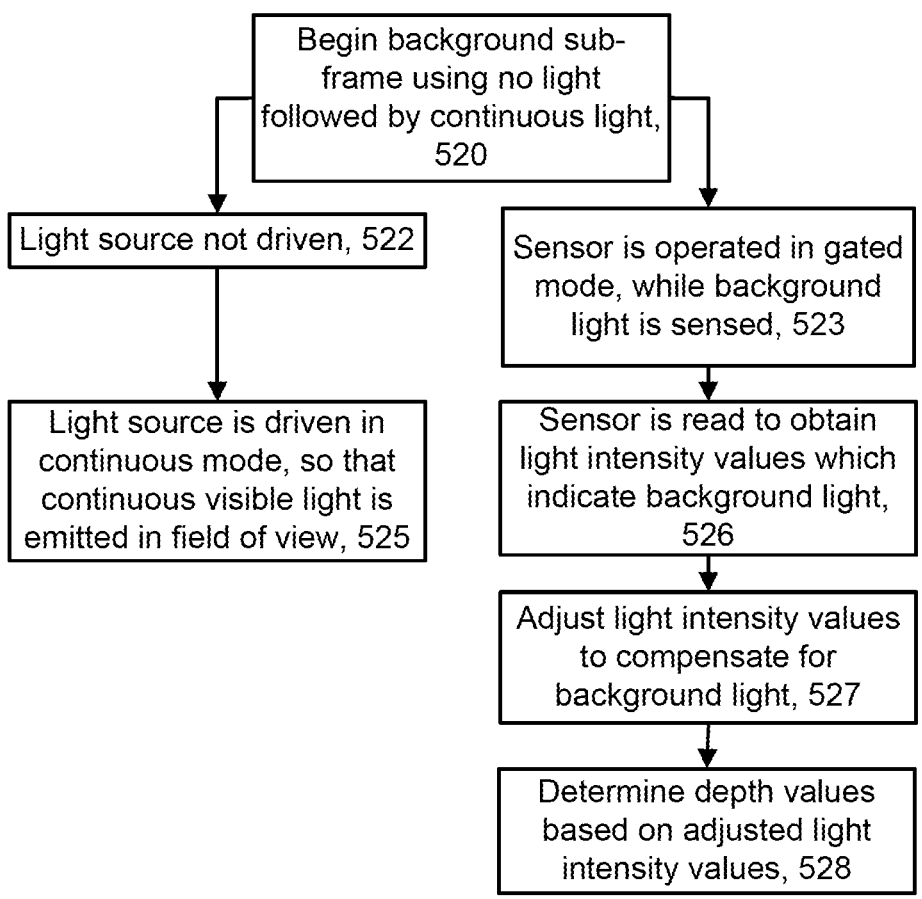
FIG. 5C depicts an example of a process for providing a background sub-frame as set forth in step 414 of FIG. 4B.

FIG. 5C depicts an example of a process for providing a background sub-frame as set forth in step 414 of FIG. 4B. Step 520 begins a background sub-frame which uses no light followed by continuous light from the projector. Steps 522 and 523 can occur concurrently, at least in part. In step 522, the light source is not driven so that no visible light is emitted in the field of view. See time 16-18 msec. in FIG. 7A. In step 523, the sensor is operated in a gated mode, while background light is sensed. The background might also be sensed in an ungated mode. A gated mode "simulates" the way the background light is received during the active illumination phases. See time 16-18 msec. in FIG. 7B.

Steps 525 and 526 can occur concurrently, at least in part. At step 525, the light source is driven in a continuous mode, so that continuous visible light is emitted in the field of view. See time 18-24 msec. in FIG. 7A. At step 526, the sensor is read to obtain light intensity values which indicate an amount of background light. See time 18-24 msec. in FIG. 7B. At step 527, the light intensity values which were determined at step 505 of FIG. 5A or step 516 of FIG. 5B are adjusted based on the light intensity values of step 526. The adjustment can involve subtracting the background light intensity values. Note that the adjustment for reflectivity should be made after the adjustment for background light. Normalizing of the gated image by the ungated image is used to provide depth data. Normalizing using the background image can be omitted, for example, when operating the projector in the dark. At step 528, depth values are determined based on the adjusted light intensity values.

Figure 5D:
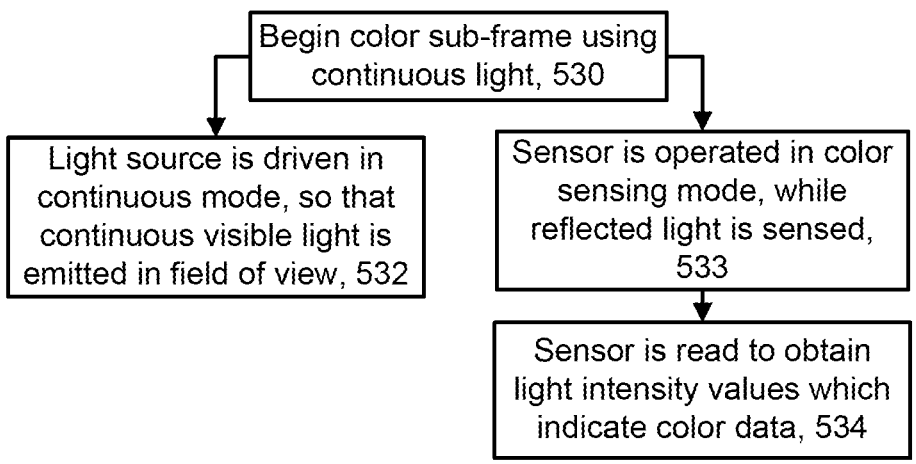
FIG. 5D depicts an example of a process for providing a color sub-frame as set forth in step 416 of FIG. 4B.

FIG. 5D depicts an example of a process for providing a color sub-frame as set forth in step 416 of FIG. 4B. Step 530 begins a color sub-frame which uses continuous light from the projector. Steps 532 and 533 can occur concurrently, at least in part. In step 532, the light source of the projector is driven in a continuous mode, so that continuous visible light is emitted in the field of view. See time 24-26 msec. in FIG. 7A. In step 533, the sensor is operated in a color sensing mode, which is a standard digital camera sensing mode, while reflected light (as well as background light) is sensed. See time 24-26 msec. in FIG. 7B. At step 534, the sensor is read to obtain light intensity values which indicate color data.

Figure 6A:
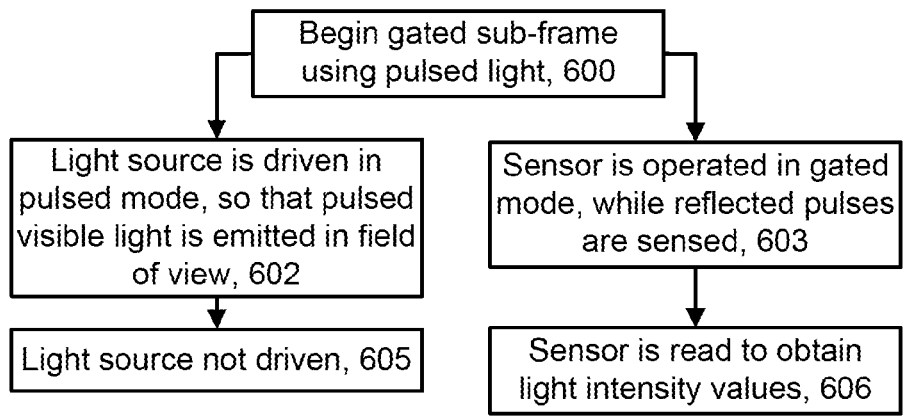
FIG. 6A depicts an example of a process for providing a gated sub-frame as set forth in step 420 of FIG. 4C.

FIG. 6A depicts an example of a process for providing a gated sub-frame as set forth in step 420 of FIG. 4C. Step 600 begins a gated sub-frame which uses pulsed light. Steps 602 and 603 can occur concurrently, at least in part. In step 602, the light source of the projector is driven in a pulsed mode, so that pulsed visible light is emitted in the field of view. FIGS. 9A and 10A provide example waveforms for pulsed light. See also time 0-2 msec. in FIG. 5A. In step 603, the sensor is operated in a gated mode, while reflected pulses (as well as background light) are sensed. FIGS. 9B and 10B provide example waveforms for sensed light. See also time 0-2 msec. in FIG. 8B.

Steps 605 and 606 can occur concurrently, at least in part. At step 605, the light source is not driven, so that no visible light is emitted. See time 2-8 msec. in FIG. 8A. At step 606, the sensor is read to obtain light intensity values. See time 2-8 msec. in FIG. 8B. The light intensity values can be stored for subsequent use in determining depth values. For example, the light intensity values may be adjusted based on light intensity values which are obtained in the ungated sub-frame and optionally the background sub-frame. The adjusted light intensity values can then be used to determine depth values.

Figure 6B:
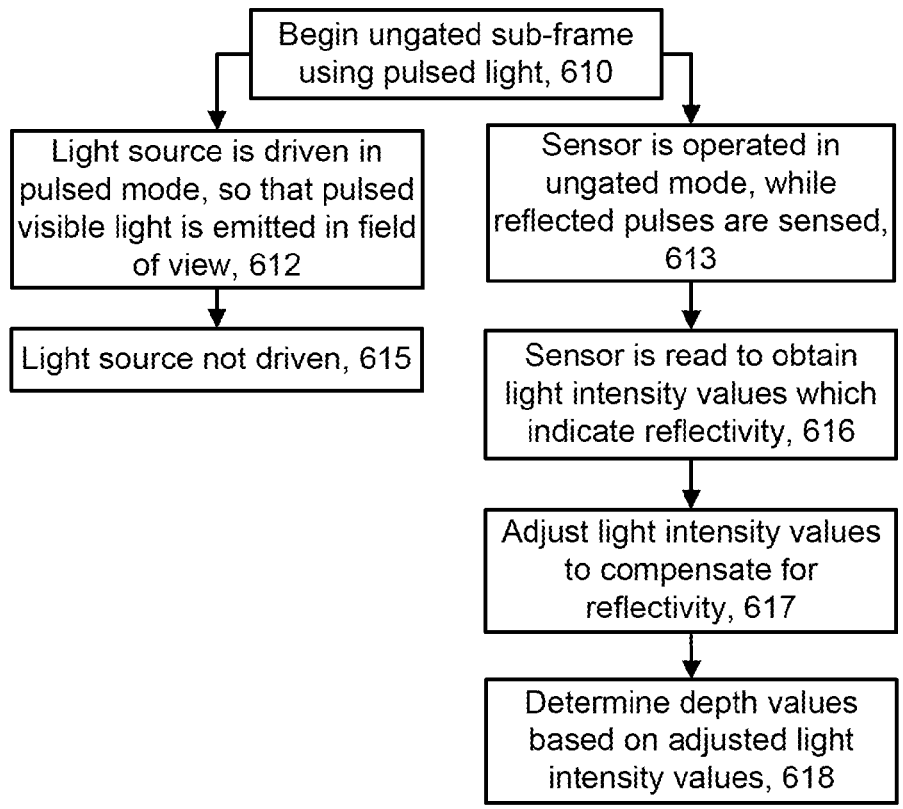
FIG. 6B depicts an example of a process for providing an ungated sub-frame as set forth in step 422 of FIG. 4C.

FIG. 6B depicts an example of a process for providing an ungated sub-frame as set forth in step 422 of FIG. 4C. Step 610 begins an ungated sub-frame which uses pulsed light. Steps 612 and 613 can occur concurrently, at least in part. In step 612, the light source is driven in a pulsed mode, so that pulsed visible light is emitted in the field of view. FIGS. 9A and 10A provide example waveforms for pulsed light. See also time 8-10 msec. in FIG. 8A. In step 613, the sensor is operated in an ungated mode, while reflected pulses (as well as background light) are sensed. FIGS. 9B and 10B provide example waveforms for sensed light. See also time 8-10 msec. in FIG. 8B.

Steps 615 and 616 can occur concurrently, at least in part. At step 615, the light source is not driven. As a result, no visible light is emitted. See time 10-16 msec. in FIG. 8A. At step 616, the sensor is read to obtain light intensity values which indicate reflectivity. See time 10-16 msec. in FIG. 8B. At step 617, the light intensity values which were determined at step 606 of FIG. 6A are adjusted based on the light intensity values of step 616. At step 618, depth values are determined based on the adjusted light intensity values.

The example implementation of FIGS. 7A and 7B, discussed below, is for a QQVGA mode which includes a 33 msec. frame period which is divided into four sections or sub-frames. This is an example of a frame which include depth-sensing, color sensing and projecting. Many other implementations are possible. Moreover, as mentioned, different sub-frames can be used in different frames. For example, some sub-frames can be used less frequently than every frame while other sub-frames are used every frame.

FIG. 7A depicts an output of a projector which corresponds to the process of FIG. 4B. In an example frame period of 33 msec., four sub-frames are provided. A gated sub-frame extends from 0-8 msec. From 0-2 msec. the projector outputs a pulsed visible light. From 2-8 msec., the projector outputs a continuous visible light having an amplitude I2. An ungated sub-frame extends from 8-16 msec. From 8-10 msec. the projector outputs a pulsed visible light. From 10-16 msec., the projector outputs a continuous visible light. A background sub-frame extends from 16-24 msec. From 16-18 msec. the projector outputs no visible light. From 18-24 msec., the projector outputs a continuous visible light. A color sub-frame extends from 24-33 msec. From 24-26 msec. the projector outputs a continuous visible light. From 26-33 msec., the projector continues to output a continuous visible light.

Figure 7C:
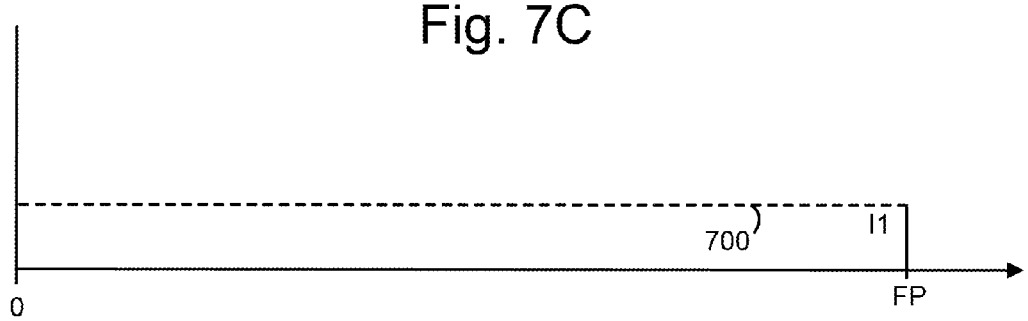
FIG. 7C depicts a non-depth-sensing frame in which continuous projection occurs.

Line 700 represents a light intensity I1 of a frame in which the projector provides a continuous output and no sensing occurs, in a non-depth-sensing frame. In one approach, a lower intensity or power output is used such that I1<I2. Providing a higher light output during a depth-sensing frame, compared to a non-depth-sensing frame, can be useful in improving color contrast of the projected image, by compensating for the periods in which pulsing or no light output is used. Another option which can be used additionally or alternatively, is to provide a longer frame period (depicted by the frame period FP in FIG. 7C) for the non-depth-sensing frame compared to the depth-sensing frame. For example FP>33 msec., where 33 msec. is the frame period of the depth-sensing frame. Either approach increases the amount of light which is output by the projector per time unit. By selectively adjusting the light intensity and/or frame period, power consumption and the projected image quality are optimized. See FIGS. 7D and 7E for further details.

FIG. 7B depicts an input to a sensor based on the projector output of FIG. 7A. Each sub-frame includes an integration or active sensing period, in which charge is generated by each pixel in the sensor in proportion to the amount of sensed light, followed by a read out or overhead period in which the amount of accumulated charge is read from all the pixels. During the read out, a portion of a pixel referred as an accumulator can be read and the accumulator zeroed out for subsequent sensing. In the gated sub-frame, from 0-2 msec. the sensor integrates or accumulates charge while the projector is pulsed, and from 2-8 msec., the accumulated charge is read out. In the ungated sub-frame, from 8-10 msec. the sensor integrates charge while the projector is pulsed, and from 10-16 msec., the accumulated charge is read out. In the background sub-frame, from 16-18 msec. the sensor integrates charge while the projector outputs no light, and from 18-24 msec., the accumulated charge is read out. In the color sub-frame, from 24-26 msec. the sensor integrates charge while the projector output is continuous, and from 26-33 msec., the accumulated charge is read out.

FIG. 7D depicts an example frame sequence which alternately provides a non-depth sensing frame using a lower light intensity I1, such as in steps 720 and 724, and a depth-sensing frame using a higher light intensity I2, such as in steps 722 and 726. Here, at least one control circuit provides, at different times: (a) a depth-sensing frame (steps 722 and 726) in which the at least one control circuit derives depth data regarding at least one object in the field of view based on light intensity values which are read from the sensor, using a time-of-flight principle, and (b) a non-depth-sensing frame (steps 720 and 724) in which the at least one control circuit does not derive depth data regarding the at least one object in the field of view. Moreover, the at least one control circuit causes the light source to emit visible light at a higher illumination power during the depth-sensing frame than during the non-depth-sensing frame.

Another option involves different depth-sensing modes. Generally, at least one control circuit is controllable to selectively operate in a first mode in which the at least one control circuit uses a limited number of one or more frames to obtain depth data regarding the at least one object in the field of view, and in a second mode in which the at least one control circuit continuously obtains depth data regarding at least one object in the field of view. For example, the limited number of one or more frames to obtain depth data, in the first mode, can be a single frame, or a small number of frames in a period of up to, e.g., one second. This can be used to provide a snap shot depth-sensing mode in which depth data is obtained for an object in the field of view, such as a static object, based on a user command. For example, depth data can be obtained for an object of interest. In the second mode, depth data is continuously obtained for an object of interest, such as a moving object. As mentioned, the projector mode need not be used when obtaining depth data.

FIG. 7E depicts an example frame sequence which alternately provides a non-depth sensing frame using a shorter frame period/duration, such as in steps 730 and 734, and a depth-sensing frame using a longer frame period, such as in steps 732 and 736.

The example implementation of FIGS. 8A and 8B, discussed below, is for a QQVGA mode which includes a 33 msec. frame period which is divided into two sub-frames, where sensing only is performed. This is an example of a depth-sensing frame and a non-projecting frame.

FIG. 8A depicts an output of a projector which corresponds to the process of FIG. 4C. A gated sub-frame extends from 0-8 msec. From 0-2 msec. the projector outputs a pulsed visible light. From 2-8 msec., the projector outputs no visible light. An ungated sub-frame extends from 8-16 msec. From 8-10 msec. the projector outputs a pulsed visible light. From 10-16 msec., the projector outputs no visible light. Similarly, in a remainder of the frame, from 16-33 msec., the projector outputs no visible light. In this mode, the background image is obtained from the color image, from 16-33 msec., since they are essentially identical.

FIG. 8B depicts an input to a sensor based on the projector output of FIG. 8A. In the gated sub-frame, from 0-2 msec. the sensor integrates charge while the projector is pulsed, and from 2-8 msec., the accumulated charge is read out. In the ungated sub-frame, from 8-10 msec. the sensor integrates charge while the projector is pulsed, and from 10-16 msec., the accumulated charge is read out. In a remainder of the frame, from 16-33 msec., a background sub-frame and color sub-frame, which are essentially the same, can be sensed. As mentioned, this mode allows the video projector device to operate in a sensing-only mode, where no projection occurs, so that power consumption is reduced. No visible light is emitted at a time other than during the gated sub-frame and the ungated sub-frame. For example, the light source can be turned off to reduce power consumption.

FIG. 9A depicts pulsed light which is output from a projector using square waveforms. Time-of-flight principles allow the depth of a point on an object in a field of view to be determined based on an elapsed time for light to travel from the projector to the point and to be reflected back to the sensor. Moreover, an amount of light registered by a pixel on the photosurface of the sensor during the gated period is used to determine distance to a surface element of the scene imaged on the pixel. An example pulse rate is 44 Mhz. Along the x-axis, which represents time, Δt1 represents a pulse duration of example pulses 900 and 920, and Δt2 represents a period between the starting of each pulse. Along the y-axis, which represents projected light intensity, each pulse is stepped up and has an essentially square wave shape, in this implementation. In one approach, each pulse steps up from a level of essentially zero intensity to a maximum level. In another approach, each pulse steps up from a non-zero level of intensity to a maximum level. In another approach, the projected intensity follows a continuous-wave modulation such as a sine wave, instead of providing separate light pulses. In this case, the phase difference between sent and received signals is measured, rather than directly measuring a particular light pulse's total trip time. As the modulation frequency is known, this measured phase directly corresponds to the time of flight. A pulsed light source can be obtained by driving the light source accordingly.

FIG. 9B depicts pulsed light which is input to a sensor based on the projector output of FIG. 9A. The x-axis of FIG. 9B is time-aligned with the x-axis of FIG. 9A. When the sensor is in a gated mode, a gated period Δt3 is defined in which sensing can occur. Sensed light is represented by pulses 910 and 930. Typically, Δt3>Δt1 so that time margins Δt4f and Δt4b are provided at the front and back, respectively, of each gated period. The time of flight (TOF) represented by the pulses 900 and 910 is depicted. The sensed pulses 910 and 930 correspond to the projected pulses 900 and 920, respectively. An ambient or floor level of sensed light is depicted as being present throughout the sensing.

FIG. 10A depicts pulsed light which is output from a projector using triangular waveforms. A triangular waveform can be considered to be a pulse which has at least one of: (a) a leading edge which transitions higher at a rate which is below a step up rate of the modulator, and (b) a trailing edge which transitions lower at a rate which is below a step down rate of the modulator. That is, the leading edge is controlled to transition up at a rate which is slower than a fastest possible rate, which is an immediate step up, and/or the trailing edge is controlled to transition down at a rate which is slower than a fastest possible rate, which is an immediate step down. Such as waveform can have symmetric or non-symmetric leading and trailing edges. In one option, the waveform reaches a maximum amplitude and remains at that level for some time so that the waveform has a trapezoidal shape, such as with example waveforms 1000 and 1010. Waveform 1000 includes a leading edge 1002, a maximum amplitude 1004 and a trailing edge 1006. In another option, the waveform is a triangle which has a sharp peak.

FIG. 10B depicts pulsed light which is input to a sensor based on the projected output of FIG. 10A. The sensed waveforms 1020 and 1030 correspond to the projected waveforms pulses 1000 and 1010, respectively.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A video projector device, comprising:
a light source;
a driver which drives the light source;
an optical component which projects visible light from the light source in a field of view;
a sensor which senses visible light, the sensor comprises a plurality of pixels; and
at least one control circuit associated with the driver and the sensor, the at least one control circuit:
to project a frame of pixel data on an object in a frame period, divides the frame period into multiple sub-frames including a gated sub-frame, and causes the video projector device to operate in a projection and sensing mode followed by a projection-only mode, without sensing, during the gated sub-frame,
to provide the projection and sensing mode: causes the driver to drive the light source in a pulsed mode in which the light source emits pulses of visible light while causing the sensor to operate in a gated mode so that the plurality of pixels integrate charge from reflections of the pulses of visible light from the object,
to provide the projection-only mode, without sensing: causes the driver to drive the light source in a continuous mode in which the light source emits continuous visible light while reading out an integrated charge from the plurality of pixels to obtain light intensity values, and
derives depth data regarding the object in the field of view based on the light intensity values, using a time-of-flight principle.

2. The video projector device of claim 1, wherein:
the multiple sub-frames comprise an ungated sub-frame following the gated sub-frame; and
the at least one control circuit provides the ungated sub-frame by causing the driver to drive the light source in the pulsed mode while the sensor is operated in an ungated mode, followed by causing the driver to drive the light source in the continuous mode while the sensor is read to obtain light intensity values, where the at least one control circuit adjusts the light intensity values obtained during the gated sub-frame based on the light intensity values read from the sensor and obtained during the ungated sub-frame, to compensate for reflectivity of the object in the field of view.

3. The video projector device of claim 1, wherein:
the multiple sub-frames comprise a background sub-frame following the gated sub-frame; and
the at least one control circuit provides the background sub-frame, in which no visible light is emitted by the video projector device toward the object while the sensor is operated in a gated mode to sense background light, followed by causing the driver to drive the light source in the continuous mode while the sensor is read to obtain light intensity values, where the at least one control circuit adjusts the light intensity values obtained during the gated sub-frame based on the light intensity values read from the sensor and obtained during the background sub-frame, to compensate for the background light in the field of view.

4. The video projector device of claim 3, wherein:
the at least one control circuit provides two of the background sub-frames in the multiple sub-frames.

5. The video projector device of claim 1, wherein:
the multiple sub-frames comprise a color sub-frame following the gated sub-frame; and
the at least one control circuit provides the color sub-frame by causing the driver to drive the light source in the continuous mode while the sensor is operated in a standard color sensing mode, followed by causing the driver to drive the light source in the continuous mode while the sensor is read to obtain light intensity values which include color data from the field of view.

6. The video projector device of claim 1, wherein:
the multiple sub-frames comprise a color sub-frame in which the at least one control circuit causes the driver to drive the light source in the continuous mode while the sensor is active.

7. The video projector device of claim 1, wherein:
the at least one control circuit causes the driver to drive the light source using triangular shaped pulses during the gated sub-frame.

8. The video projector device of claim 1, wherein:
the at least one control circuit causes the driver to drive the light source using pulses which each have at least one of: (a) a leading edge which transitions higher at a rate which is below a step up rate of the light source, or (b) a trailing edge which transitions lower at a rate which is below a step down rate of the light source.

9. The video projector device of claim 1, wherein:
the light source is a backlight of the video projector device.

10. The video projector device of claim 1, wherein:
the light source, the optical component, the at least one control circuit and the sensor are provided in a common housing.

11. The video projector device of claim 1, further comprising:
at least one light-transmissive LCD panel which encodes video information onto the visible light, the at least one light-transmissive LCD panel comprises a plurality of pixels.

12. The video projector device of claim 1, wherein:
the at least one control circuit focuses the optical component based on the depth data.

13. The video projector device of claim 1, wherein:
the pulses of visible light are provided during a limited period, relative to a period in which the continuous visible light is provided, so that image quality of an image projected on the object is not noticeably reduced.

14. A video projector device, comprising:
a light source;
a driver which drives the light source;
an optical component which projects visible light from the light source in a field of view;
a sensor which senses visible light, including visible light which is reflected from an object in the field of view, the sensor comprises a plurality of pixels; and
at least one control circuit which alternately causes a depth-sensing frame and a non-depth-sensing frame to be projected onto the object, the at least one control circuit:
  (a) to provide the depth-sensing frame:
    causes the driver to drive the light source in a pulsed mode in which the light source emits pulses of visible light during one portion of the depth-sensing frame,
    causes the sensor to operate in a gated mode during the one portion of the depth-sensing frame to detect the pulses of visible light,
    derives depth data regarding the object in the field of view based on light intensity values which are read from the sensor, using a time-of-flight principle, and
    causes the driver to drive the light source in a continuous mode in which the light source emits continuous visible light during another portion of the depth-sensing frame, and
  (b) at a different time than the depth-sensing frame, to provide the non-depth-sensing frame:
    causes the driver to drive the light source in a continuous mode in which the light source emits continuous visible light, and
    does not derive depth data regarding the object in the field of view.

15. The video projector device of claim 14, wherein:
the at least one control circuit causes the light source to emit visible light at a higher illumination power during the depth-sensing frame than during the non-depth-sensing frame.

16. The video projector device of claim 14, wherein:
the depth-sensing frame is longer than the non-depth-sensing frame.

17. The video projector device of claim 14, wherein:
the at least one control circuit is controllable to selectively operate in a first mode in which the at least one control circuit uses a limited number of one or more frames to obtain depth data regarding the object in the field of view, and in a second mode in which the at least one control circuit continuously obtains depth data regarding object in the field of view.

* * * * *